Aug. 31, 1926.

S. STUART ET AL 1,598,170

CAN CAPPING MACHINE

Filed Feb. 4, 1925    11 Sheets-Sheet 1

Fig.1.

SYDNEY STUART
WILLIAM HENRY JONES
INVENTORS
By
their Attorney

Aug. 31, 1926.

S. STUART ET AL

CAN CAPPING MACHINE

Filed Feb. 4, 1925    11 Sheets-Sheet 7

SYDNEY STUART
WILLIAM HENRY JONES
INVENTORS
By
their Attorney

Aug. 31, 1926.

S. STUART ET AL

CAN CAPPING MACHINE

Filed Feb. 4, 1925

SYDNEY STUART
WILLIAM HENRY JONES
INVENTORS
their Attorney

Patented Aug. 31, 1926.

1,598,170

UNITED STATES PATENT OFFICE.

SYDNEY STUART AND WILLIAM HENRY JONES, OF LEICHHARDT, NEAR SYDNEY, NEW SOUTH WALES, AUSTRALIA, ASSIGNORS TO JOHN HEINE & SON LIMITED, OF LEICHHARDT, NEAR SYDNEY, NEW SOUTH WALES, AUSTRALIA, A REGISTERED COMPANY.

CAN-CAPPING MACHINE.

Application filed February 4, 1925, Serial No. 6,717, and in Australia December 10, 1924.

This invention relates to multispindle machines for seaming preformed caps on preformed can bodies. It belongs to the machines of the type in which preformed bodies and preformed caps are supplied into the capping assembly through separate feeders, the caps brought to register with the can bodies one by one in the feeder assembly and the caps then taken up and set on the bodies by pneumatic action chucks which hold them during a seaming operation performed during the rotation of the can bodies in a turret, out of which at the completion of the seaming operation the capped cans are delivered onto a take-off table or belt.

In known multiple body capping machines in which the seaming rolls are revolved around the capped body while it is carried in a chuck, the cap chuck cannot be moved vertically and used for picking up the caps from the assembly table and placing them on the bodies; in those machines the capped body is raised up to meet the cap chuck after the caps have been placed on the bodies by other mechanism. This vertical movement of the cam bodies and the cap placing mechanism involves operating difficulties, and slopping or surging of the can contents is liable to displace the caps after they have been located on the bodies and unsatisfactory closing frequently happens. In contrast with these machines, the machine in which the present invention consists is characterized in that the can bodies are not at any time moved from one plane after they enter the machine; the caps are however lifted from the cap assembly table and set down on the bodies by the cap chucks and are retained by said chucks in placed position on the bodies while in rotation, with the seam brought into contact with the seaming rolls, the register of which with the seam is ensured by the mounting of the roll assembly on the cap chuck casing. In one known type of multiple spindle capping machine the cap chucks are operated to lift the caps from the assembly table and set them down on the bodies, and the caps after thus being set down on the bodies are temporarily fixed to the bodies by means of a clinching device, and they are then transferred to a turret in which the already clinched-on cap is seamed. In this type of machine the cap chucks do not carry the seaming roll assemblies on them as in the case of the machine which is the subject of the present invention, and consequently when these old type machines are used an additional machine operation is called for to perform the seaming on of the caps to the bodies.

The present invention includes novel features in the structural form and arrangement of various elements in the machine assembly, and it consists primarily in seaming devices which are carried on cap picking and holding chuck casings in permanent register with those chucks with the object of perfecting the seaming, which in known machines of this type is dependent upon the correct vertical adjustment of the seaming chucks in relation to the seaming rolls. Another main feature of the invention is in the means provided for alteration of the setting of the machine to enable it to be operated with cans of different length. Other features comprise an improved construction of a multiple spindle turret in which a suction tube in the chuck, through which air is exhausted for the purpose of lifting the caps from the assembly table and holding them on the chucks by pneumatic action, is structurally adapted for ejecting the finished cans from the cap chucks; the chucks are moved down in timing towards the caps and when close to the caps the caps are raised by the suction and thus taken up by the chucks which continue in their movement and carry them around the turret centre, and after clearing them from the assembly table move downward with them in register with the cans, the suction being broken as soon as the caps have been thus set on the cans. The invention also includes means for facilitating inspection of the cans in progress through the machine; means for adjusting the seaming rolls according to the pressure required to be applied to the seams; and means for carrying the seaming tools adjustably on the chuck casings in operative relation to cams which operate to force them against the seams to close them and in a separate operation to lock them.

In the accompanying drawings:—

Figure 8:
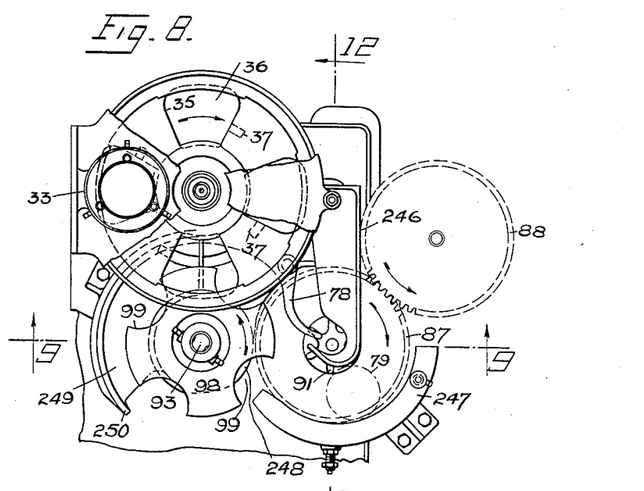
Fig. 8 is a fragmentary plan view explanatory of the construction and arrangement of the feeder mechanism.
Figure 9:
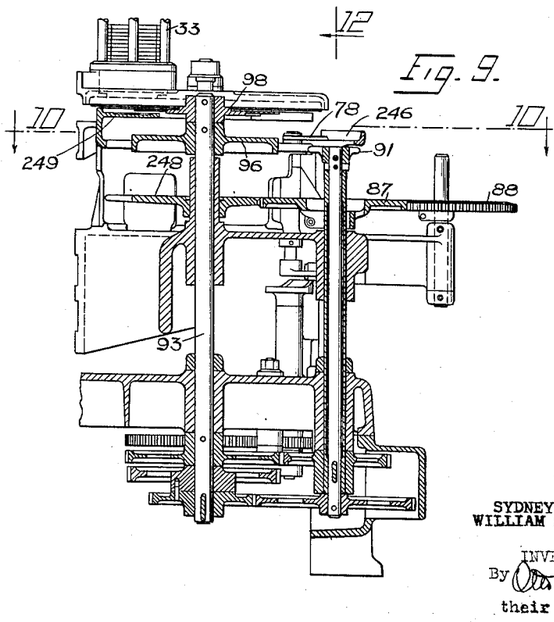
Fig. 9 is a vertical section on the plane 9—9 Fig. 8.
Figure 10:
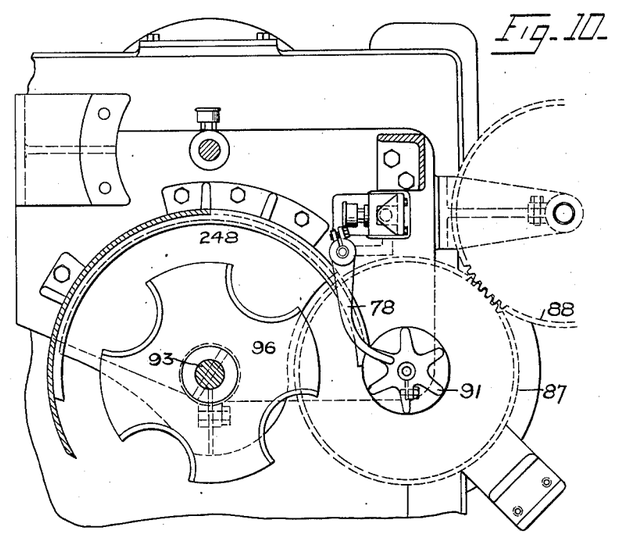
Fig. 10 is a horizontal plan on the plane 10—10 Fig. 9.
Figure 11:
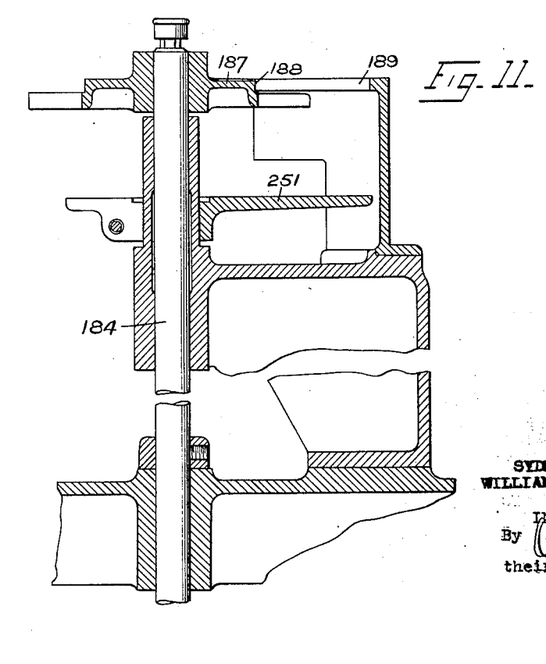
Fig. 11 is a fragmentary vertical section on the centre line through the rotary transfer device in which the cans with the seams closed are transferred from the primary turret in which the seams are closed to the secondary turret in which the seams are locked.
Figures 12, 13:
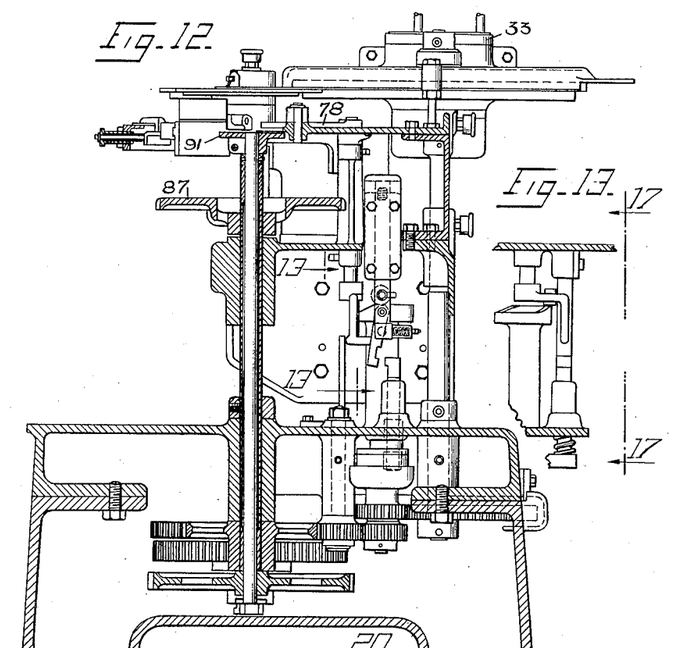
Fig. 12 is a vertical section on the plane 12—12 Fig. 8.
Fig. 13 is a fragmentary sectional elevation of portion of the interlocking clutch mechanism by means of which delivery of caps is arrested during any interruption in the feed of bodies into the machine.
Figures 14, 15:
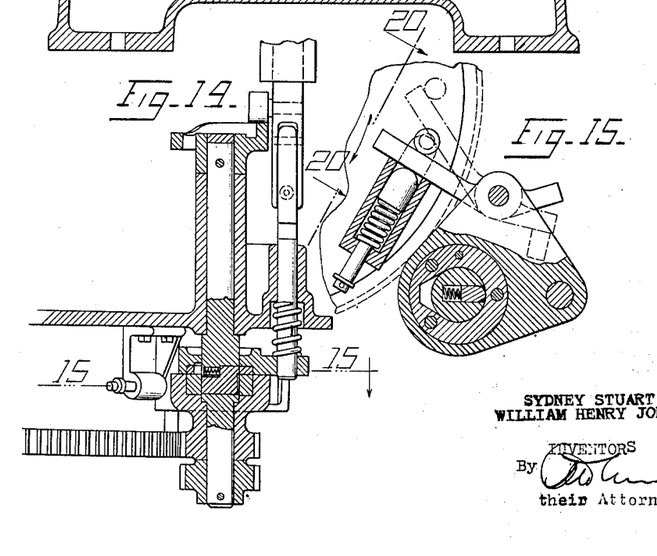
Fig. 14 is a fragmentary vertical sectional elevation through the automatic clutch showing it in disengaged position.
Fig. 15 is a horizontal section on the plane 15—15 Fig. 14.
Figure 16:
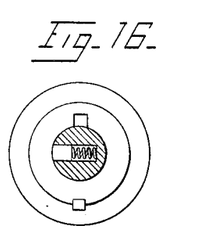
Fig. 16 is a transverse section through the clutch boss and enclosing parts showing the clutch key in disengaged position.
Figure 17:
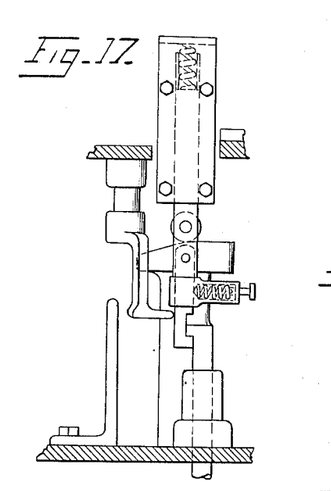
Fig. 17 is a fragmentary elevational view taken from the position 17—17 Fig. 13 showing the clutch key engaged.
Figure 18:
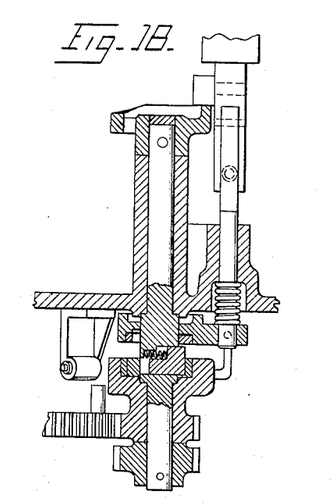
Fig. 18 is a fragmentary vertical sectional elevation through the automatic clutch showing it in engaged position.
Figure 19:
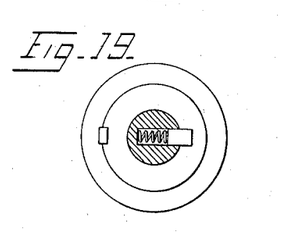
Fig. 19 is a similar view showing the clutch key in engaged position.
Figure 20:
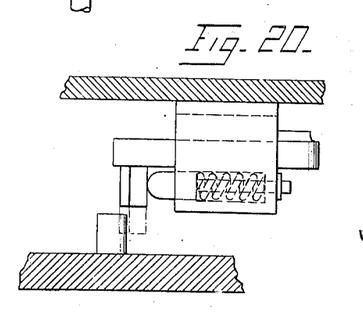
Fig. 20 is a fragmentary elevational view taken from the position 20—20 Fig. 15.

Formed can bodies are supplied onto the rotary feed table 88 which passes them onto the rotary race table 87 where their movement is timed by the star wheel 91. They are moved off the table 87 onto the fixed assembler table 248 by the cruciform rotary head 96. They are moved off this table one by one onto the body chucks of the seam closing turret as hereinafter described. The caps are stacked in the carrier 33 and are removed one by one from the bottom of the stack by the rotating knife plate 35, and as they are so taken from the stack are moved over the table 36 by pusher fingers 37 (see Fig. 8) and delivered onto the fixed cap assembly table 249 which is located directly over the body assembly table 248. They are moved around the table 249 by the rotating cruciform head 98 which is fixed on the vertical shaft 93 which carries also the cruciform head 96 every body on the table 248 thus having a cap on the table 249 above it, both moving at the same rate towards the turret chucks. The primary turret assembly, in which the caps are placed on the bodies and the seams closed, is built on the vertical shaft 105 which is a fixture in the machine frame. The transfer turret which takes the capped cans from the primary turret and brings them to the secondary turret is carried on the vertical rotary spindle 184. The secondary (seam locking) turret on the vertical shaft 208 (see Fig. 1) like the primary turret shaft 105, is fixed in the frame, and the delivery star wheel 244 is mounted on the vertical rotary spindle 243. The means whereby the feed of can caps is interrupted when there is any interruption in the regular feed of can bodies are the subject of a concurrent application for Patent (No. 6,760 dated 4th February, 1925), to which reference may be made for a particular description of those parts which are shown in Figs. 8 to 20 of the drawings. When the caps are nearing the offtake end of the table 249 they are picked up by the pneumatic cap chucks of the primary turret which sweep over that part of that table, while the can bodies immediately below them are pushed by the distributor 96 onto the turret body chucks 116 as said chucks sweep past the edge of the body assembly table 248. Each cap chuck when it picks up a cap, carries the cap above the body in the body chuck below it until it is clear of the tables 248 and 249, and the cap chuck is then caused to descend and force the cap onto the body end. As the rotational movement of the turret progresses the seam closing rolls are caused to bear against the seam and infold it, and the can body with the closed (but not locked) seam is delivered out of the turret at a later stage in its rotation onto the transfer table 251 over which these capped bodies are swept by the cruciform transfer wheel 187. They are thence taken by the chucks of the secondary turret. As that turret rotates the seam locking rolls are caused to act on capped cans carried in it to lock the cap seams, and at the completion of this operation the lock seamed cans are delivered out of the secondary turret onto the receiving table 252 and are moved along that table by the take off star wheel 244. The edge of the table 88 is geared to the edge of the table 87, and the table 87 is mounted for rotation on a vertical spindle 89; the star wheel 91 is keyed on the top end of that spindle. It engages the cans 79 in its jaws as they pass successively over the table 87 between the fences 246—247 which guide the can bodies in their movement upon it. The table 87 is rotated at a faster rate than the star wheel 91 so that while the table moves the can bodies the star wheel operates to regulate their movement. 78 is a trigger which obtrudes in the path of the can bodies 79 as they are about to pass from the rotary table 87 onto the fixed table 248. The trigger functions to control clutch mechanism which is described fully in concurrent application No. 6760 by means of which operation of the cap feeder is arrested whenever a can body is missing from the regular train of cans 79 which should pass over the table 87. As the can bodies 79 pass out of the race 246—247 they are embraced in the bays 99 of the cruciform wheel 96 which ensures that they will pass in spaced and timed order onto the table 248 and will subsequently pass onto the rotatable body tables of the primary (seam closing) turret. The caps are stacked in tier in the rack 33. As this rack is open sided the stock of caps in the machine is under observation. The caps are taken one by one from the bottom of this stack by a device of known construction. That device comprises a slotted plate 35, the leading edges of which are formed as knives or are armed with knives which engage under the edges of the lips of the caps successfully as they pass the stack, releasing them one by one from the bottom of the stack and causing them to fall forwardly of the knife edge onto a circular fenced table 36. 37 are drag fingers on the underside of the knife plate 35; these fingers take behind the caps as they fall on the table 36 and they move the caps over the table 36 and thence onto the assembly table 249; they are moved along said table in contact with a segmental fence which surrounds a sector of it by the cruciform wheel 98 which operates also to space them apart; it is in register with the cruciform wheel 96 which controls the movement of the can bodies and drives them over the table 248 which is directly below the table 249. As each cap approaches the end of the table 249 one of the primary turret heads comes to register with it and at the moment when it is in central register with it, a pneumatic chuck in that head of the turret is forced down onto it mechanically, the suction valve is opened, and vacuum is established behind the cap. The cap is thus taken up onto the chuck and in the forward movement of the chuck is cleared from the assembly table 249. Simultaneously with the taking up of each cap by a turret chuck, a can body below, which has been moved over the body assembly table 248 by the cruciform wheel 96 in register with the corresponding cap movement over the table 249, is pushed by the cruciform wheel 96 onto a rotatable body table 116 which is located immediately below the cap chuck in which the cap has been taken up. The cap chuck is now moved downwards (the body and the cap being clear of the assembly tables) so as to force the cap onto the top of the body.

The turret construction and the operation of the seam closing device will now be described.

Figure 3:
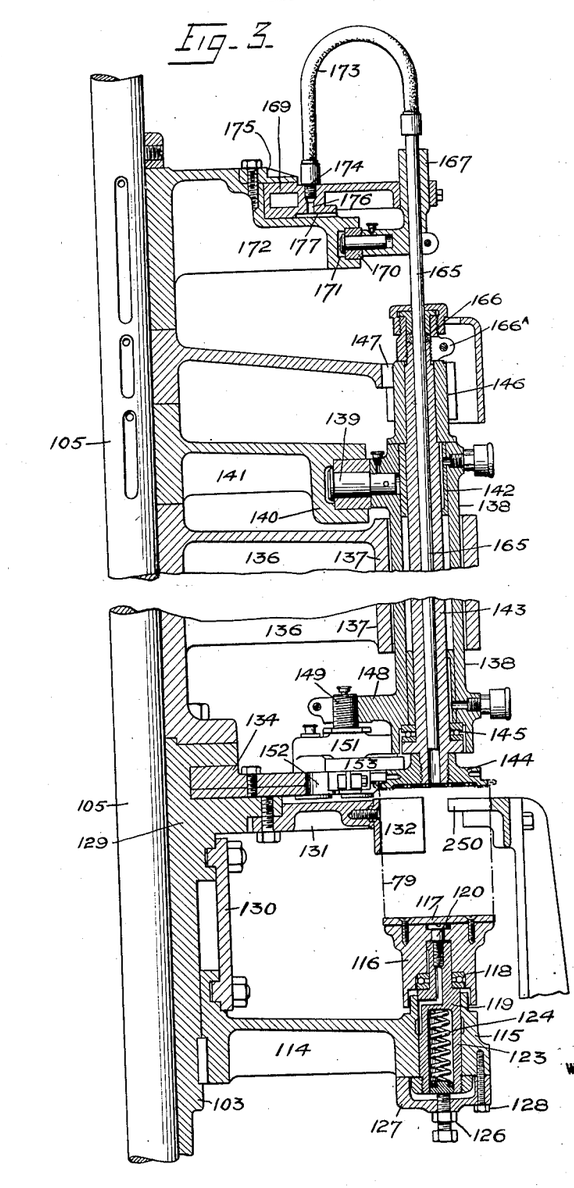
Fig. 3 is an enlarged vertical section through one of the turret heads in the cap locating and seam closing turret assembly.

The shaft 105 is fixed in the frame member 106 and is non-rotatable and 172 is a circular table fixed to the shaft 105. An annular race which accommodates a ring 169 is formed around the peripheral portion of the table 172 and the ring member 169 is located in this race by a cap ring 175. 181 is an air pipe arranged for connection by a flexible pipe to a main air pipe which leads to a vacuum pump. On the end of it this pipe 181 carries a valve block 178 which fits slidably in a pocket in the table 172 and is backed by a spring 179 to keep its orifice face 180 in contact with the under face of the ring 169. The inner ends 174 of flexible pipes 173 are fixed in the ring 169, which is ported below each such connection; one of these pipes 173 is fitted for each head of the turret. As shown the turret has eight heads symmetrically disposed. It may have a greater or lesser number of heads. The ports 176 leading to the respective pipes 173 come successively into register with the valve face 180 as the turret is rotated. As they so come into register, suction is established through the registering pipe 173 and through the rod pipe 165 which forms the central portion of the turret head and which is connected at its top end to the outer end of the pipe 173. The rod pipe 165 is carried in a slide head 167 which is housed in a guide formed in the outer part of the ring 169, and it is armed with an offset roller 170 which runs in a cam groove 171 in the rim of the table 172. The ring 169 is rotated with the turret head, and consequently the offset rollers 170 traverse the cam groove 171 in each rotation of the turret; that cam groove is shaped to apply an ascending movement to the roller 170 and so to the rod pipe 165 before the turret head reaches the pick-up point at which a cap is taken up on the chuck 144. At that position in the rotation of the turret the pneumatic chuck 144 is pressed downward onto the cap which is come to the take off position on the cap assembly table 249. The valve faces 176—180 come into register for a short distance at the pick-up point, this distance being determined by the length of the arcuate port 180 of the valve 178. Vacuum is thus produced in the pneumatic chuck when it is located immediately above a cap ready to be picked up from the table 249, and the vacuum is maintained sufficiently long to hold the cap on the chuck until the chuck has descended and has placed the cap on the can body. The vacuum is interrupted while the valve port 176 is opened to atmosphere through the slot 177 (see Fig. 3) in the underside of the ring 169. During the revolution of the turret, the cap seams of the cans are closed while the chucks hold the caps down on the bodies. The closing mechanism and its operation are described below.

When the turret head has reached the discharging position, where it delivers the closed-seam can to the transfer table 251, the rod tube 165 is forced downward by the movement imparted to the offset roller 170 in the cam groove 171 in the table 172, and when its bottom end strikes the top of the cap the can is released from the chuck to which it is bound more or less during the application of pressure to the seam in the closing operation. In the absence of this can releasing arrangement the can might remain gripped by the chuck so that delivery to the table 251 would not be affected freely.

Figure 4:
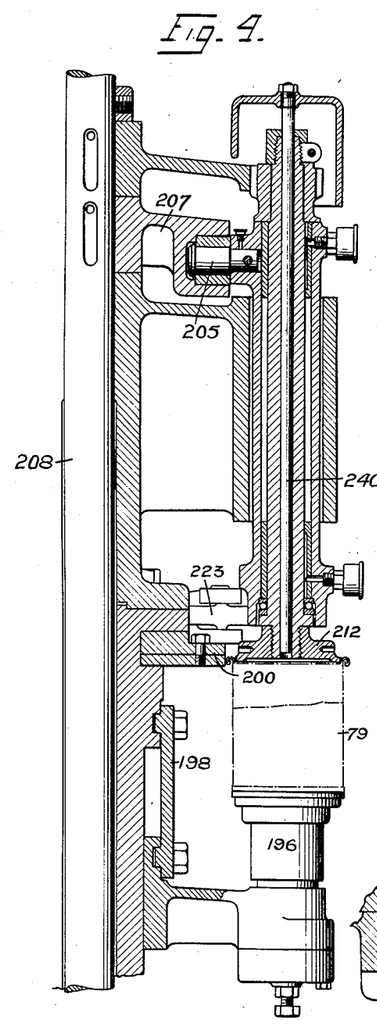
Fig. 4 is a fragmentary vertical section through one element of the turret in the seam locking assembly.
Figure 5:
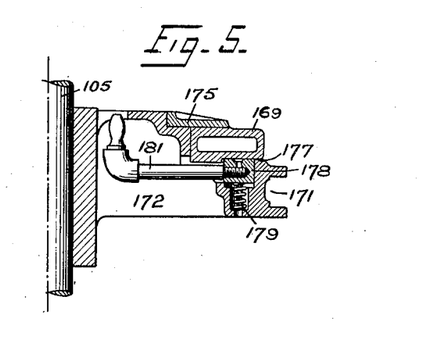
Fig. 5 is a fragmentary sectional view explanatory of the automatic vacuum control valve which is associated with the cap carrying device in the primary turret assembly.
Figure 6:
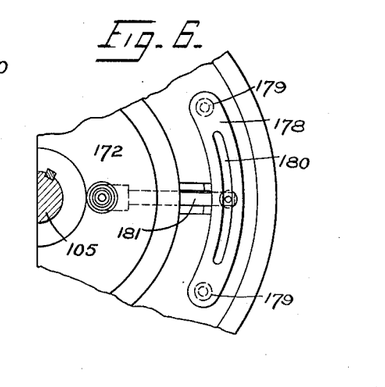
Fig. 6 is a broken plan view relating to the parts shown in Fig. 5.
Figure 7:
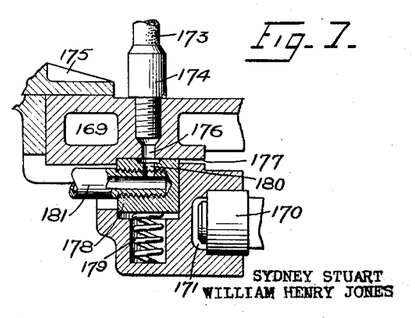
Fig. 7 is a fragmentary sectional view to be read with Fig. 5 for explanation of the operation of the automatic vacuum valve.

The chuck heads 144 function as mandrels which set inside the caps (see Figs. 3, 4 and 26); these mandrel heads are fixed on the bottom ends of tubular spindles 143 which surround the rod tubes 165; these tubular spindles 143 are fitted with stuffing boxes 166 at their top ends and they are mounted for rotation in the tubular bodies 138 of the heads and are checked against endwise movement therein by thrust bearings 145 and by clamp collars 166ᴬ at their top ends. The thrust is taken on the ball races 145, 142 being bushes which centralize the parts, and 137 tubular casings in a spider 136 which is freely rotatable on the fixed shaft 105. An offset crank pin 139 on the side of each of the casings 138 is armed with an anti-friction roller 140 which runs in a cam groove in the peripheral portion of a table 141 which is keyed to the fixed shaft 105. 147 is a spur wheel fixed on the shaft 105; it engages a long slip pinion 146 which is keyed on the top end of the tubular mandrel spindle 143. As the turret heads revolve around the fixed spindle 105 and the spur wheel 147 is fixed to that spindle, rotation is applied during such movement to the tubular spindle 143 and consequently to the mandrel head 144 of each chuck. The cam groove in the edge of the table 141 is shaped to apply the necessary vertical movements at correctly timed intervals to the casings 138, and consequently to each turret head successively. It is accordingly shaped to apply a downward movement to each turret head at the pick-up position when the chuck receives the cap, and it operates to hold down the chuck and so to force the cap down on the can body during the seam closing operation. At the end of that operation the roller 140 running over a rise in the cam causes the head to lift; this lifting movement brings the can cap up against the bottom end of the rod tube 165 and so procures release of the capped can from the chuck at the moment when it is required to be delivered out of the primary turret to the transfer table 251.

The tables (see Fig. 3) on which the can bodies are carried are cushioned and are rotatable on ball races. Each table body 116 is shod with a disc 117 of hard metal. It contains a ball race 118 which rests on a shouldered stud 119 with check screw 120 to maintain the assembly. The stud 119 is tubular in the bottom end of it (123) and a cushion spring 124 is housed in the core space. This spring is adjusted for tension by a screw 126 with set nuts under the bottom cap 127 through which it works, this cap being fixed on to the bottom of the socket 115 on the spider frame 114 by screw pins 128. The hollow stud 119 is held in the socket by a nut within the cap 127 and it is free to slide downward in the socket 115 when it is so loaded as to flex the spring 124. The bottom end of the body 116 is spigoted over the top of the socket 115 with clearance for free rotation of the body on the pin 119. The relief spring 124 effects automatic adjustment of the clearance between the top and bottom chucks to accommodate slight difference in length of cans, which in practice vary more or less within small limits.

250 is a ring fence enclosing the outer side of the path through which the cans are moved whilst in a chuck during seaming, and 132 is a centreing claw which supports the cans on the inner side of said path; this claw is carried on a bracket ring 131 which is bolted to the heavy hub 129 about which the cams 134 are supported.

Figure 1:
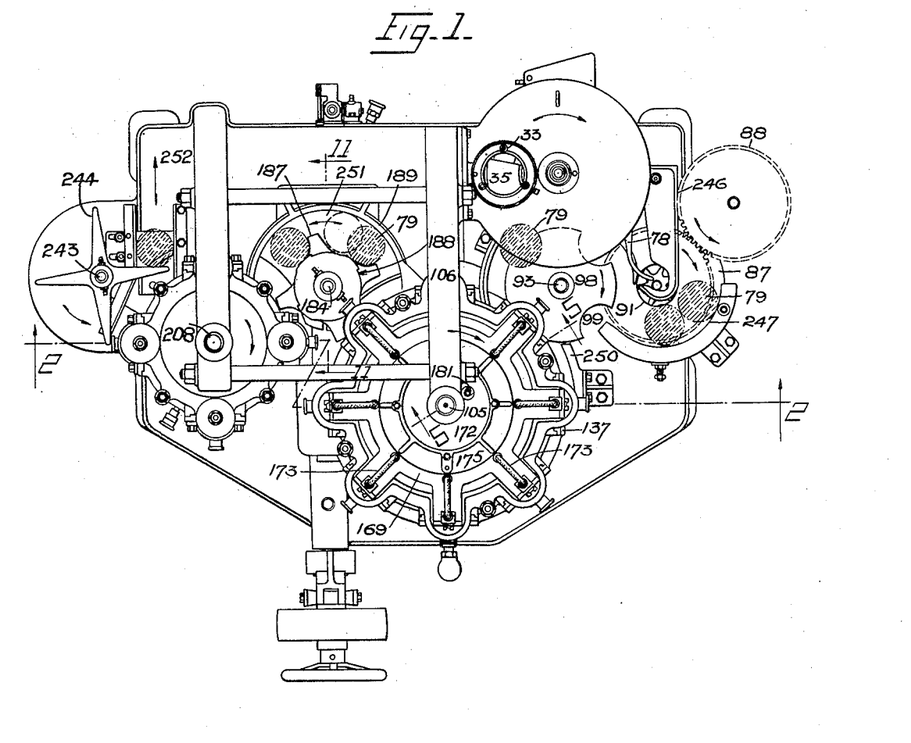
Fig. 1 is a top plan of the machine.
Figure 2:
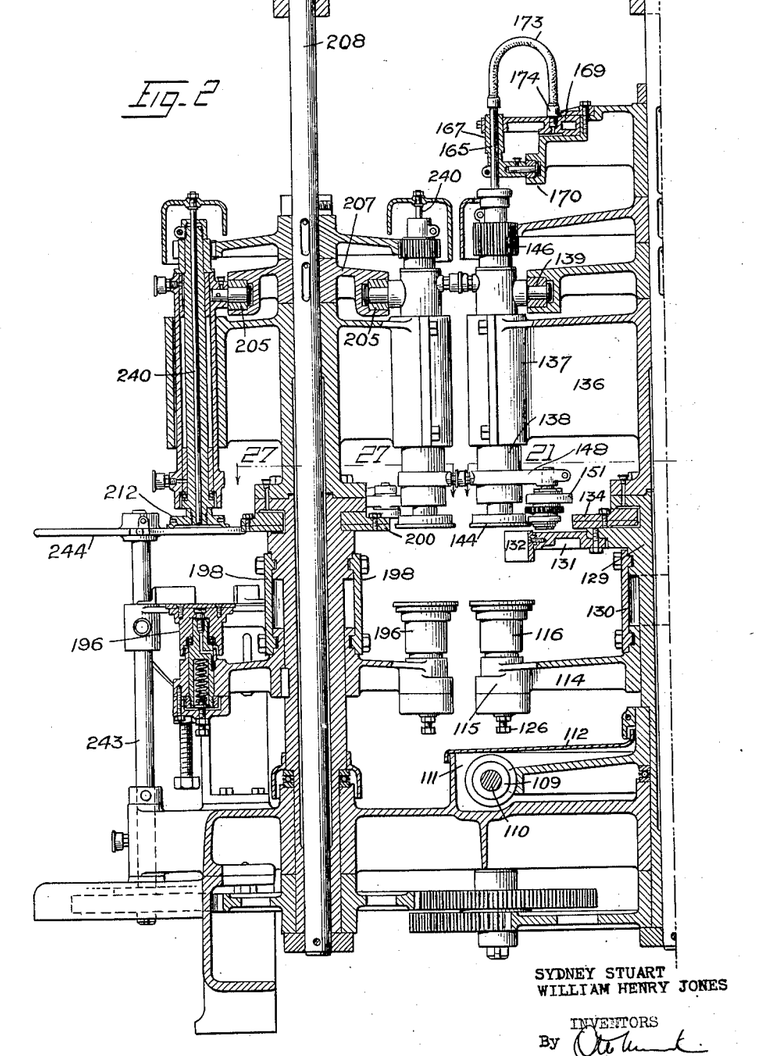
Fig. 2 with Fig. 2ª is a vertical section on enlarged scale taken on the plane 2—2 Fig. 1.
Figures 21, 22, 23:
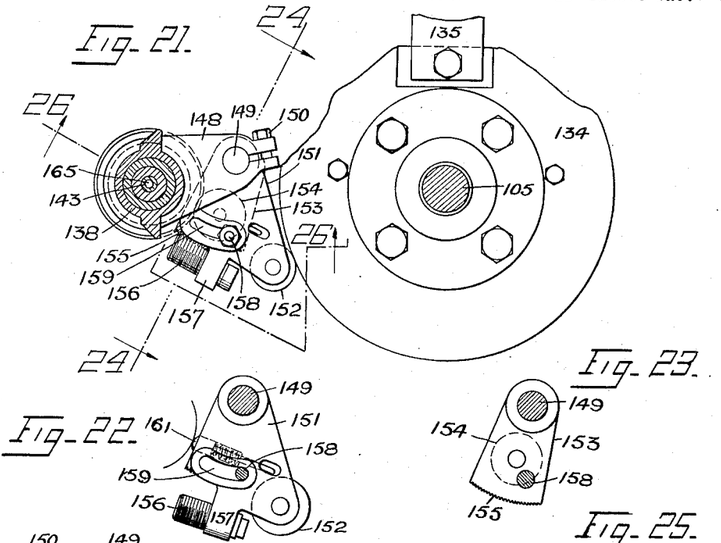
Fig. 21 is a horizontal section on the plane 21—21 Fig. 2.
Figs. 22 and 23 are fragmentary plan views of portions of the seam closing roll assembly.
Figure 22:
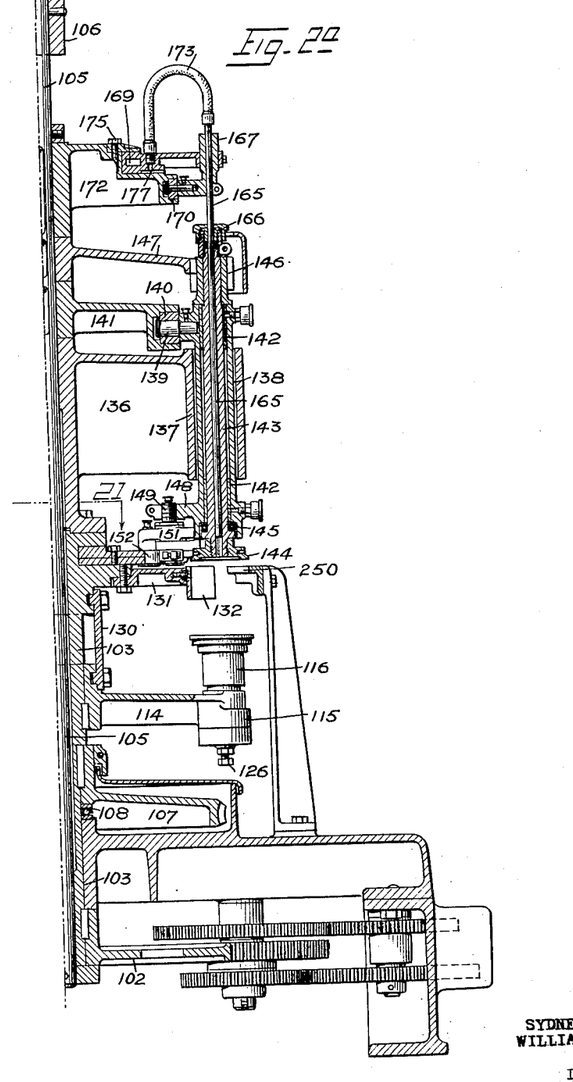
Figure 25:
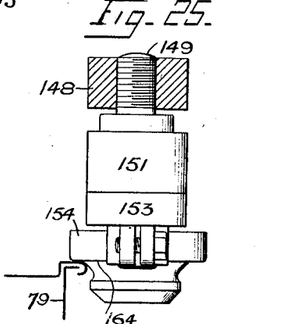
Fig. 25 is a fragmentary elevational view explanatory of the operation of the seam closing roller, showing it at the moment when it is about to engage the open seam and close it.
Figure 26:
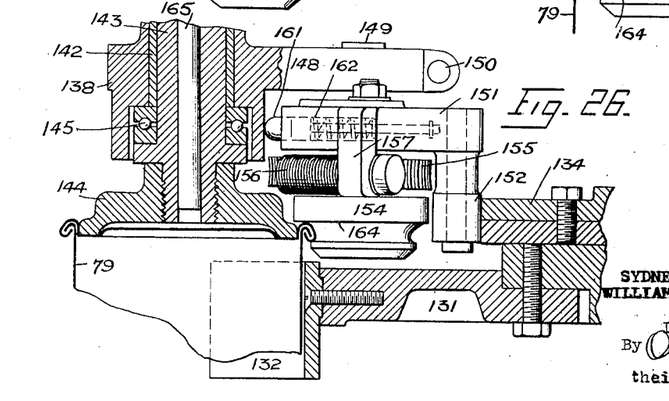
Fig. 26 is a fragmentary vertical section showing the seam closing roller in relation to the can and the turret chuck when the closing of the seam has been nearly completed.
Figures 27, 28, 29:
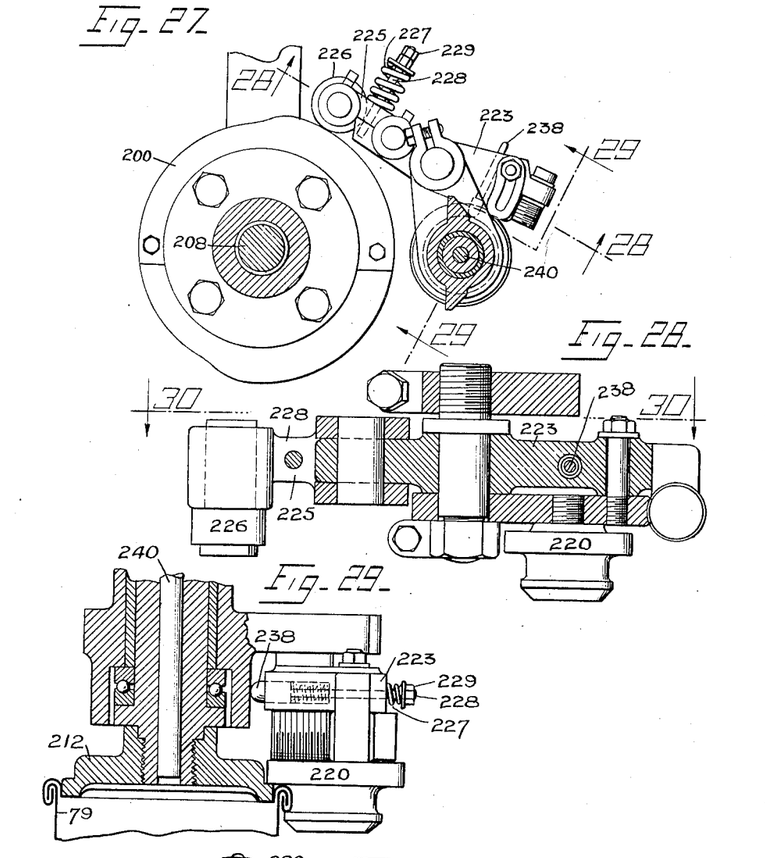
Fig. 27 is a horizontal section through portion of the secondary or seam locking turret taken on the plane 27—27 Fig. 2.
Fig. 28 is a vertical sectional elevation on the plane 28—28 Fig. 27.
Fig. 29 is a fragmentary sectional elevation on the plane 29—29 Fig. 27.
Figure 30:
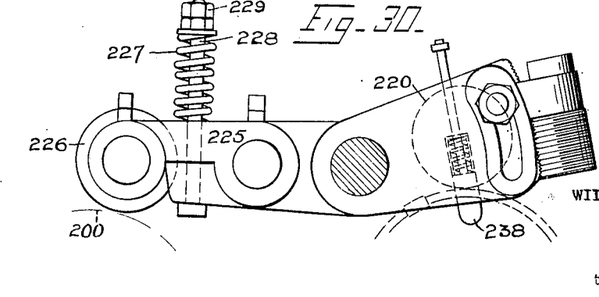
Fig. 30 is a plan view taken on the plane 30—30 Fig. 28.

The seam closing rolls are bracket mounted on the lower part of the turret head casing 138; they are therefore always in correct level register with the chuck mandrel. 148 is an offset bracket on the head casing 138; it carries a screwed stud 149 upon which the seam closing roll assembly is pivotally mounted. Vertical adjustment of this assembly in relation to the chuck 144 is obtained by turning this screw 149 in the bracket 148. When adjustment has been effected the parts are locked by the clamp bolt 150 which bites together the split ends of the bracket 148 so as to clamp the stud 149. 151 is an arm mounted on the stud 149. 159 is an arcuate slot in this arm through which passes a bolt 158, the end of which is fixed in the adjuster arm 153 which also is mounted for movement about the pin 149. The arm 153 is sector shaped and has worm toothing 155 cut in the edge of it to be engaged by a worm 156 which is mounted between collars on a lug 157 extending from the bracket 151. 152 is a tappet roller; its spindle is mounted on the arm 151 and its operating position in relation to the cam plate 134 is seen in Figs. 2 and 26. This cam plate 134 is preferably constructed in sections. It is held rigidly by a frame bracket 135 and is supported concentrically on the fixed shaft 105 by a heavy grooved sleeve 129 which is rotatable relatively to it and to the shaft 105 and is fixed to the bottom end of the hub of the casing bracket spider 136 and is keyed to the worm wheel 107 to which primary drive is applied through the worm 109 on the drive shaft 110. 108 is a ball thrust bearing which takes the load of the sleeve 129 and the parts associated with it. This bracket 135 (see Fig. 21) enters the clearance space between the body tables and the cap chucks below the position shown by the bracket 106 in Fig. 1. The shape of the cam 134 is shown in Fig. 21. The tappet roller 152 is moved outward as it rides over the high part of the cam 134, and in this movement it swings the arm 151 around the pin 149. The seam closing roll 154 is mounted for free rotation on a stud in the adjusting arm 153. The screw adjustment of 153, which is set by screwing home the set pin 158, enables the setting of the seam closing roll 154 for correct engagement with the seam around the can cap (see Figs. 25 and 26) with the appropriate degree of pressure determined by the adjustment of the screw 156 to close the seam as shown in Fig. 26 and leave it ready for locking. The alignment of the groove below the roll shoulder 164 with the rim of the chuck mandrel 144 is secured by the adjustment of the screw pin 149, and perfect action of the roll 154 on the seam is thus always secured, any risk of mis-alignment in vertical position or range of movement between the chuck mandrel and the roll being entirely eliminated, as the roll moves with the chuck mandrel and occupies always the same vertical relation to it. In the vertical movement of the cap chuck, the tappet rollers 152 slide endwise over the face of the cam 134 but do not lose contact with it. The seam closing roll 154 continues to operate on the seam during the whole period that the tappet roller 152 is riding over the high part of the cam 134, the can being spun continuously by the rotation of the chuck 144 which rotation is produced by the running of the pinion 146 over the fixed spur wheel 147. 161 is a plunger buffer backed by compressed helical spring 162 housed in the arm 151, and bearing against the side of the chuck casing 138 below the bracket 148. 238 is a similar buffer in the assembly shown in Fig. 29. 111—112 is a casing enclosing the worm drive gear. The driving motion is transmitted through the sleeve 103 and the spur wheel 102 to other wheels in the assembly in sequence to effect operation of all the elements of the machine in correct relative timing.

The vertical relation of the spider 114 which carries the body tables to the table 141 and the spider 136 which carries the cap chucks, is regulated by spacing bars or plates 130 which are bolted to the hub portions of the boss 129 on the sleeve 103 and to the hub portion of the spider 114 respectively. To alter the setting of the machine to take different lengths of can bodies, space bars 130 of corresponding length are used as shown in Fig. 2. These bars or plates 130 serve also to hold the body chucks in axial alignment with the corresponding cap chucks. Similar space bars 198 are provided in connection with the seam locking assembly through which the capped cans pass in the second operation which is hereinafter described.

When a turret head carrying a capped can body, reaches its nearest position to the spindle 184, its closing roll 154 is released, as at that time the tappet roller 152 associated with it passes from the high part to the low part of the cam 134. At this point the rod tube 165 is forced downward, this movement being effected by the roller pin 170 passing through a low part of the cam groove 171 in the edge of the table 172. The seam closed can is thus forced off the chuck 144 and delivered onto the transfer table 251 where it is engaged by the cruciform transfer wheel 187 and moved towards the seam locking turret on said table with its outer part contacting with the fence 189. As seen in Fig. 1, the can 79 while passing over the transfer table 251 may be inspected, the inner flanges 188 of the race being interrupted to allow any can to be lifted out if it be found that it has been mutilated, or that for any other reason it should not be passed to the locking turret. The cans are swept directly off the table 251 by the cruciform transfer wheel 187 onto the chucks 196 of the secondary (seam locking) turret. Immediately a capped can passes on to a chuck 196 in that turret the top chuck is moved downward by the action of the tappet pin 205 which runs in the edge cam groove in the table 207 and the can is then embraced between the upper and lower chucks. Thereafter, as the turret rotates, the seam is locked (see Fig. 29) by the locking roll 220 acting against it while it is backed by the chuck mandrel 212. The mounting of the locking roll 220 and the means for operating it and adjusting it are substantially identical with the mounting and the operating and adjusting means associated with the seam closing rolls 154, but provision is made in this case for relieving the seam locking roll 220 as it is passing over the vertical seam of the can body, where owing to the extra laminæ of metal at this place, undue compression would otherwise be applied with bad finishing as a result; this relieving device is shown in Figs. 27 to 30 and will now be described.

Figure 24:
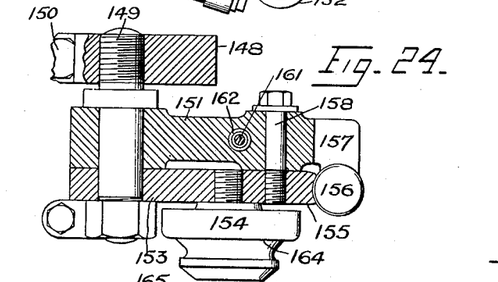
Fig. 24 is a sectional elevation of the seam closing roll assembly taken on the plane 24—24 Fig. 21.

The tappet roller 226 which runs on the cam 200 is carried on an arm 225 which is pivotally mounted on the arm 223 which arm 223 corresponds with arm 151 in the seam closing assembly (see Fig. 24). The two arms are held in normal relative position by a helical spring 227, the tension of which is adjustable by means of nuts 229 on a stud 228 the butt of which is fixed in the end of the arm 223 against which the arm 225 is pressed by the spring 227. When the locking roll 220 is passing over the vertical seam thickness, the spring 227 flexes sufficiently to allow the carrier arm 223 to back off the tappet roller arm 225 sufficiently to allow for the extra thickness of metal while yet retaining the full measure of locking pressure required to finish the seam.

When the seam locking operation has been completed the cans are ejected from the cap chuck 212 by the thrust of the rod tube 240 as the chuck rises and are swept off the body table 196 onto the take-off table 252 by means of the star finger wheel 244 which is keyed on the vertical rotating spindle 243. The leading end of the table 252 is cut away to leave clearance for the body chucks 196 to move past it during the take-off operation performed by the wheel 244.

What we claim as our invention and desire to secure by Letters Patent is:—

1. A multiple spindle can capping machine including non-lifting rotatable tables for carrying can bodies, vertically movable rotating chucks by which caps are placed and held in position on said bodies during the seaming operation, and a seaming roll assembly mounted on the casing of each cap chuck and movable vertically as a unit with said chuck.

2. A multiple spindle can capping machine including non-lifting rotatable tables for carrying can bodies, vertically movable rotating chucks by which caps are placed and held in position on said bodies during the seaming operation, a seaming roll assembly mounted on the casing of each cap chuck and movable vertically as a unit with said chuck, and means for setting the machine to operate on bodies of different lengths.

3. In a multiple spindle can capping machine according to claim 1, means for setting the machine to operate on bodies of different lengths, said means including a carrier for the cap chucks, a carrier for the body tables, and detachable interchangeable plates for securing the said body table carrier at any height in relation to the cap chuck carrier, with the body tables in axial alignment with the cap chucks, the length of said plates being proportioned to the length of the bodies required to be capped.

4. In a multiple spindle can capping machine according to claim 1, a seaming roll assembly comprising a bracket on the casing of a cap chuck, a carrier arm pivotally mounted on said bracket and adjustable horizontally and vertically in relation to the cap chuck, and a seaming roll carried on said arm and coacting with said cap chuck, the seaming roll assembly and the cap chuck being movable vertically as a unit.

5. In a multiple spindle can capping machine, a cam fixed on the centre shaft of the turret, a seaming roll assembly comprising a bracket fixed to the casing of a cap chuck, a carrier arm pivotally mounted on said bracket, a seaming roll and a tappet roll carried on said arm, said tappet roll co-acting with said cam to govern the angular position of the seaming roll in relation to the cap chuck.

6. In a multiple spindle can capping machine, a seaming roll assembly carried on a cap chuck casing and including a fixed cam and a tappet roller co-acting with said cam and a two part arm with micrometer adjustment and lock for setting the seaming roll in relation to the tappet roller.

7. In a multiple spindle can capping machine, a seam locking roll assembly comprising a bracket on the casing of cap chuck, a carrier arm pivotally mounted on said bracket, a seaming roll carried on one end of said carrier arm and co-acting with said cap chuck, an extension arm pivotally mounted on the other end of said carrier arm, a pressure relieving spring for holding said arms in normal relative position, a tappet roller mounted on said extension arm and a fixed cam co-acting with said tappet roller in the seaming operation.

8. In a multiple spindle can capping machine, a seam locking roll assembly carried on a cap chuck casing and including a fixed cam and a tappet roller co-acting with said cam, a three part arm with micrometer adjustment and lock for setting the locking roll in relation to the tappet roller, and a pressure relieving spring co-acting with two parts of said arm.

9. In a multiple spindle can capping machine, a seaming head including a tubular casing, an offset tappet roller on said casing, a fixed annular cam-way co-acting with said roller to impart timed vertical movements to said casing, a seaming roll assembly carried on the bottom end of said casing, a spindle rotatable within but fixed endwise in said casing, a mandrel chuck on the lower end of said spindle and co-acting with the seaming roll assembly, means for imparting rotary motion to the chuck spindle and means for revolving the seaming head about the turret axis.

10. In a multiple spindle can capping machine, a seaming head comprising a tubular casing, an offset tappet roller on said casing, a fixed annular cam-way co-acting with said roller, a seaming roll assembly mounted on said tubular casing, a spider frame freely mounted on a fixed axis, said frame slidably embracing said tubular casing and adapted for revolving it around said axis, a hollow spindle rotatable in said tubular casing, a mandrel chuck on the bottom end of said spindle, a spur gear fixed on said axis, a long toothed pinion on said spindle meshing with said spur gear around which it is revolved to rotate the cap chuck spindle, a rod tube slidable within said spindle and extending above it through a stuffing box, means for reciprocating said tube in said spindle and means for exhausting air through it from the chuck face.

11. In a multiple spindle can capping machine according to claim 10, means for exhausting air from the chuck face, said means including a rod tube slidable within the cap chuck spindle, an annular valve, a flexible pipe connecting said tube with said valve, said valve being open to atmosphere or connected to a source of vacuum according to the position of the chuck in its path of revolution.

12. In a multiple spindle can capping machine according to claim 10, means for releasing the capped can from the chuck, said means including a rod tube slidable within the cap chuck spindle and supported at its top end in a sliding bearing, a tappet roller mounted on said sliding bearing, a fixed cam ring, said roller co-acting with said cam ring to reciprocate the rod tube within the chuck spindle and release the capped can from the chuck.

13. In a can capping machine having can body and can cap feeders, a vertical seam-closing turret, a vertical transfer turret, a vertical seam-locking turret, and a take-off device co-acting with the heads in the seam-locking turret, a fixed central shaft in each of said seaming turrets, tables fixed on said shaft, an annular valve and vertical motion cams carried on said tables and a rotary sleeve adapted to carry the seaming heads.

14. In a can capping machine in which the cap seams are closed in one turret and locked in another turret, a transfer turret intermediate the closing and the locking turret, and comprising a circular table, a fenced annular race thereon over which the closed cams are passed, a star timing and spacing wheel for controlling the movement of the cams in said race and flanges on said wheel notched out to offer clearance for the lifting of cans out of the annular race, substantially as described.

15. In a can capping machine a turret head having a vertically movable tubular casing, a hollow spindle in said casing, a pneumatic chuck on the end of said spindle, a reciprocating rod tube slidable in said spindle and connected to a source of vacuum, the air service being controlled and the tube reciprocated in timing automatically in the revolution of the head around the turret axis.

16. A multiple spindle can capping machine having cushioned freely rotatable tables which revolve in a fixed horizontal plane round the turret axis, said tables being adapted to carry can bodies, pneumatic chucks for lifting caps and placing them on the bodies and for rotating the capped bodies during the revolution of the tables and the chucks around the turret centre, and seaming rolls acting against the cap seams.

17. In a multiple spindle can capping machine non-lifting rotatable tables for carrying the can bodies, pneumatic chucks for lifting the can caps, and for placing and holding said caps on the can bodies during the seaming operation in which the capped cans are rotated on their axes and revolved round the turret centre, and a seaming roll assembly mounted on the chuck casing and moving bodily with said chuck casing as a unit.

In testimony whereof we affix our signatures.

SYDNEY STUART.
WILLIAM HENRY JONES.